United States Patent [19]

Ismar

[11] 4,325,516
[45] Apr. 20, 1982

[54] APPARATUS FOR THE GRINDING OF SURPLUS BREAD

[75] Inventor: Theodor Ismar, Cologne, Fed. Rep. of Germany

[73] Assignee: Ismar GmbH, Cologne, Fed. Rep. of Germany

[21] Appl. No.: 75,731

[22] Filed: Sep. 14, 1979

[30] Foreign Application Priority Data

Sep. 15, 1978 [DE] Fed. Rep. of Germany ... 7827589[U]

[51] Int. Cl.³ .............................................. B02C 13/26
[52] U.S. Cl. .................. 241/73; 241/152 A; 241/162; 241/186.4; 241/188 R
[58] Field of Search .................. 241/152 A, 154, 162, 241/163, 188 R, 257 R, 73, 186.4

[56] References Cited

U.S. PATENT DOCUMENTS 3,214,105 10/1965 Owens .......................... 241/154 A
3,555,996 1/1971 Schwarz ........................ 241/154 X
3,643,879 2/1972 Palyi ............................. 241/154 X

FOREIGN PATENT DOCUMENTS 1507603 2/1980 Fed. Rep. of Germany .

Primary Examiner—Mark Rosenbaum
Attorney, Agent, or Firm—Oblon, Fisher, Spivak, McClelland & Maier

[57] ABSTRACT

A grinding mill for grinding surplus bread includes an upright cylindrical housing containing a preliminary grinding chamber, a subsequently arranged hammermill and a strainer through which the finished ground stock leaves the grinding mill. The preliminary grinding chamber includes rotor mounted pre-cutting knives and wall mounted breaker strips. Feeding teeth mounted on the rim of the rotor communicate the pre-cut bread from the preliminary grinding chamber through an annular gap to the hammermill for final grinding by rotor mounted mill hammers and wall mounted breaker strips.

5 Claims, 3 Drawing Figures

APPARATUS FOR THE GRINDING OF SURPLUS BREAD

BACKGROUND OF THE INVENTION

1. Field of the Invention

The invention relates to an apparatus for the grinding of surplus bread with a grinding mill with a strainer through which the finished ground stock leaves the grinding mill.

2. Description of the Prior Art

As a result of baking tests it has been shown that the quality of bread may be substantially increased by the addition of a certain amount of finely ground surplus bread. The known machinery for the grinding of surplus bread used to date have the disadvantage that they have to operate with great load variations. Large pieces of bread very quickly enter the area of the grinding mill and there cause load peaks which greatly diminish the efficiency of the grinding mill.

SUMMARY OF THE INVENTION

The invention is based on the task of providing an apparatus of the initially described kind, constructed in such a manner that the load variations are held to a minimum even if coarse grinding stock, such as half and entire loaves of bread, are fed into the mill.

The invention proposes to solve this task by providing the grinding mill with a preliminary grinding mechanism and a subsequently arranged hammer mill which are connected with each other by way of an annular gap between the single rotor and the housing of the grinding mill.

With the present invention, the applied grinding stock is first coarsely ground in a preliminary grinding device, so that it may enter the hammer mill through the annular gap. This hammermill, therefore, is fed a grinding stock of a predetermined advantageous maximum granular size, thereby avoiding to a large extent any uneven loads to the drive mechanism of the grinding mill. The invention proposed the use of a single rotor for the preliminary grinding device and for the hammermill which results in a simple construction and a compact arrangement of this device which also excells by a high hourly productivity. The latter essentially is the result of the fact that the preliminary grinder makes a utilization of the favorable traits of a hammer mill possible without having to deal with the disadvantages of such an apparatus, namely the aforementioned load variations and load peaks.

In a particular embodiment of the invention, the rotor is provided a disc, to the upper side of which coarse cutting knives are fastened at right angles to a radius line of the disc, bolts carrying mill hammers being fastened to the underside of the disc, and feeding teeth rotating within the annular gap being attached to its rim. The advantage of the coarse cutting knives lies in the fact that they act as a preliminary grinder which can cut even half and whole loaves of bread to the predetermined size of the annular gap without great load variations. The pre-cut grinding stock is then transported by means of the feeding teeth through the annular gap and into the hammer mill arranged underneath. Naturally, these feeding teeth also have a certain grinding function.

A highly advantageous preliminary grinding is the result of the fact that several coarse cutting knives are provided, whereby each two of them are diametrically arranged in varying distances from each other.

Preferably, the lower ends of the bolts which carry the mill hammers are held in a bearing arrangement witnin a rotor flange and secured by a disc superimposed upon the upper side of the rotor disc. This results in a mechanically tight and secure seating of the bolts carrying the mill hammers and a very simple mounting of the hammer mill.

In a further development of the invention, the feeding teeth are inclined towards the horizontal and welded to the rim of the rotor disc. It is not necessary to emphasize that the angle of inclination of the feeding teeth is coordinated with the rotational direction of the rotor so that the desired advance of the pre-ground grinding stock into the hammer mill takes place.

Preferably, breaker strips are arranged at the cylindrical inner wall of the hammer mill housing, and a portion of the wall within the area of the hammer mill is formed by an exchangeable strainer, adjoining a chute.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
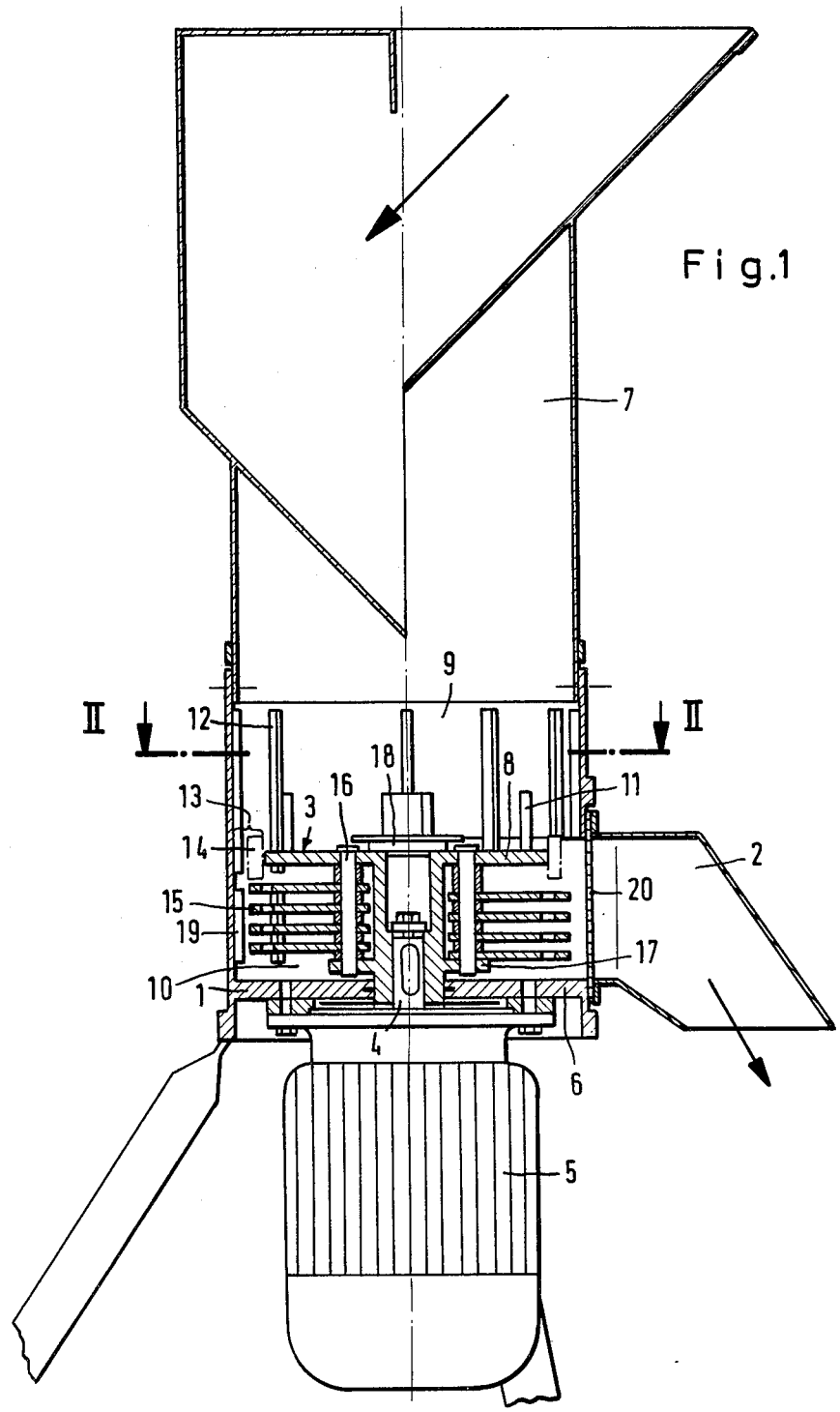
FIG. 1 is a vertical section through an apparatus for the grinding of surplus bread.

The apparatus shown has a housing 1 in the shape of an upright cylinder which is closed at the bottom, having a hinged chute 2. The rotor 3 of the grinding mill is directly mounted on the axle 4 of the activating motor 5, the axle protruding centrally through the housing floor 6 and into the housing 1. The activating motor 5 is fastened to the underside of the housing floor 6. A feeding funnel 7 is mounted to the housing 1 which is open at the top.

The rotor 3 has an upper rotor disc 8 by which the housing space is divided into two chambers, namely an upper pregrinding chamber 9 and a lower grinding chamber 10. The upper side of the rotor disc 8 is supplied with four cutting knives 11, their cutting edges running essentially parallel to the rotational axis of the rotor and being tangentially arranged, as shown in particular in FIG. 2. It is also evident from FIG. 2 that two cutting knives each are arranged diametrically to each other and that the distances of the two cutting knives of each pair are different.

Located at the cylindrical inner wall of housing 1 and opposite to the cutting knives 11 and extending upwardly and over them are breaker strips 12 which cooperate with the cutting knives 11 during the pre-grinding process.

Figure 2:
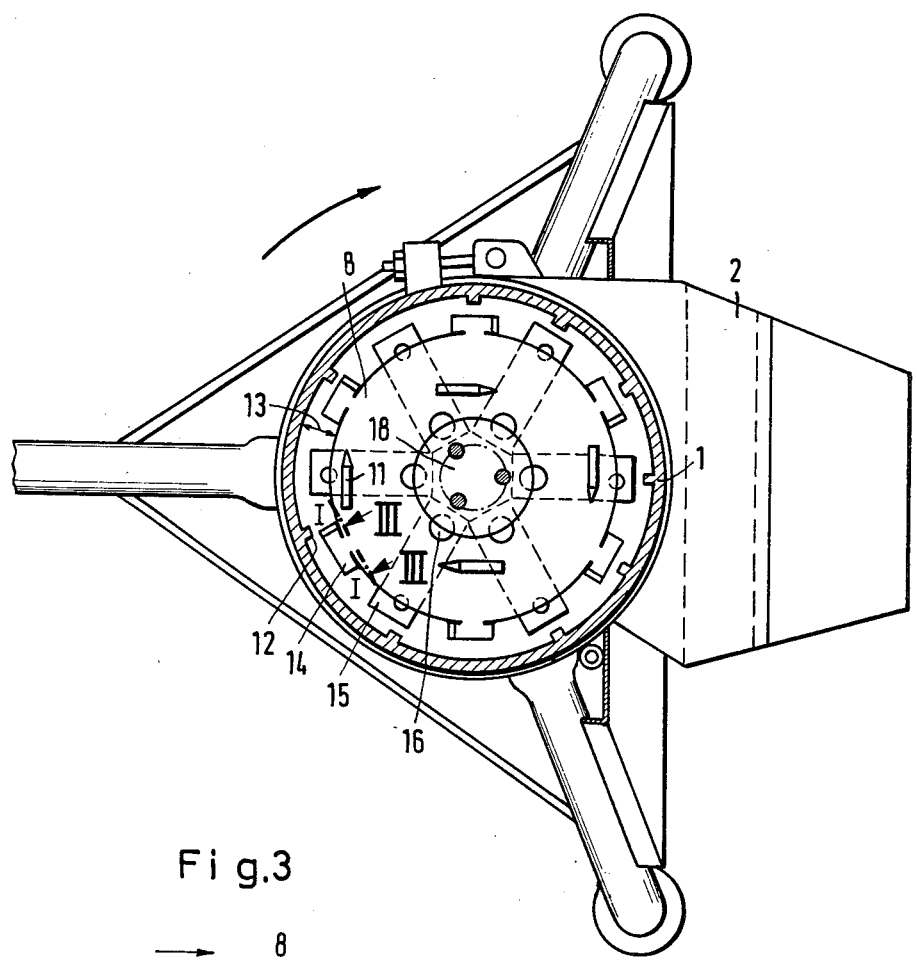
FIG. 2 is a horizontal section through the apparatus for the grinding of surplus bread according to FIG. 1 along line II—II and FIG. 3 shows a partial section through the rotor of the depicted apparatus for the grinding of surplus bread along line III—III in FIG. 2.
Figure 3:
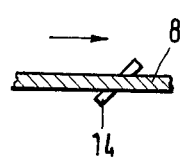

The outer rim of the rotor disc 8 is at a predetermined distance from the inner wall of the housing 1 and thus forms an annular gap 13. Rotating inside of this annular gap 13 are feeding teeth 14, made of small sheet metal plates, which are inclined towards the horizontal and are welded to the rim of the rotor disc 8. FIG. 3 shows that the angle of inclination of the feeding teeth is selected to assist the advance of the coarsely ground stock from the pre-grinding chamber 9 through the annular gap 13 and downward into the grinding chamber 10. Within this grinding chamber 10, mill hammers 15 are rotating, whereby four mill hammers each are arranged on a bolt 16 at pre-determined distances. FIG. 2 shows that a total of six groups of four mill hammers 15 each are provided. The bolts 16 at their bottom ends are attached to a rotor flange 17 and with their upper ends they are fastened in the rotor disc 8. By a centrally superimposed safety disc 18 the upper bolt heads are prevented from moving upwards. The grinding chamber 10 also has breaker strips 19 arranged at the inner wall of the housing 1 which are at a distance opposite of the mill hammers 15 and cooperate with the latter during the grinding process.

In the area of the chute 2, the wall of the grinding chamber 10 is formed by a replaceable strainer 20 through which the ground stock must pass when it has obtained the granular fineness predetermined by the strainer and before it enters the chute 2.

The apparatus described above operates in the following manner: The surplus bread — this may be halves or entire loaves of bread — enters through the feeding funnel 7 and reaches the pre-grinding chamber 9 where it is coarsely ground by the cutting knives 11 in connection with the breaker strips 12. This process continues until the ground stock has a granular size permitting it to pass through the annular gap 13 and into the grinding chamber 10 for further fine grinding.

The feeding teeth 14 lead the pre-ground stock to the mill hammers 15. These act together with the breaker strips 19 and provide fine grinding. Only when the ground stock is fine enough to pass through the openings in the strainer 20, does it leave the apparatus by way of the chute 2. The degree of the fineness of the ground stock can be varied by exchanging the strainer 20 for one with openings of a different size.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A grinding mill for grinding surplus bread comprising:
   an upright cylindrical housing;
   a single rotor disc centrally rotating within said housing and having an upper side, a lower side, and a rim;
   a plurality of paired pre-cutting knives arranged at right angles to a radius of said rotor disc and mounted on said upper side of said rotor disc;
   a plurality of mill hammers attached to the lower side of the rotor disc;
   a plurality of breaker strips mounted on the inner wall of the cylindrical housing adjacent the precutting knives and forming a preliminary grinding device in a preliminary grinding chamber;
   a plurality of breaker strips mounted on the inner wall of the cylindrical housing adjacent the mill hammers and forming a hammermill in a grinding chamber;
   said cylindrical housing and said rotor disc rim forming an annular gap therebetween and connecting said preliminary grinding chamber and said grinding chamber;
   a plurality of feeding teeth rotatably mounted within said annular gap on the rim of said rotor disc at an inclined angle to the horizontal such that a top edge portion of said plurality of feeding teeth comprises a leading edge; and
   a strainer operatively associated with said cylindrical housing through which finished ground stock is communicated from the grinding mill.

2. The grinding mill of claim 1, wherein the paired pre-cutting knives comprises at least a first and second pair of pre-cutting knives arranged at different radial distances from the axis of rotation of said rotor and positioned diametrically opposite one another.

3. The grinding mill of claim 2, further comprising:
   a rotor flange extending from the lower side of said rotor;
   a plurality of securing members upon which said millhammers are mounted, said securing members interconnecting said rotor flange and said lower side of said rotor; and
   a safety disc superimposed upon the upper side of said rotor disc for securing said securing members.

4. The grinding mill of claim 3, wherein said securing members comprises bolt members.

5. The grinding mill of claim 1 further comprising a chute member mounted on a lower portion of said cylindrical housing, wherein said strainer comprises a portion of said cylindrical housing adjacent said chute member.

* * * * *